No. 622,996. Patented Apr. 11, 1899.
I. DETHERIDGE.
CULTIVATOR.
(Application filed Feb. 1, 1899.)
(No Model.)
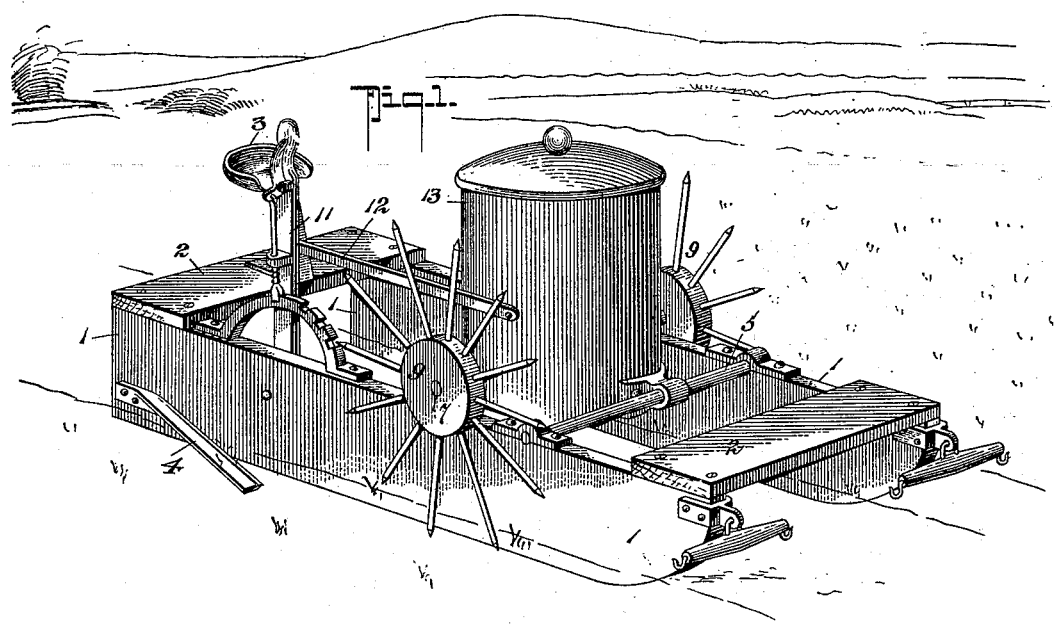
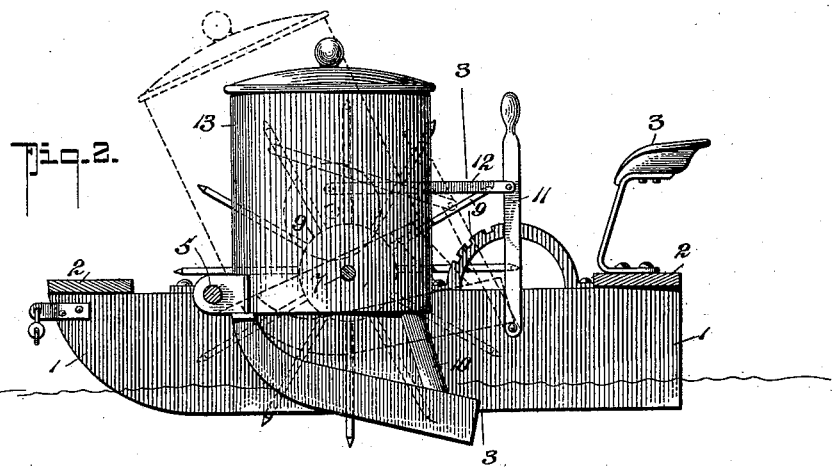
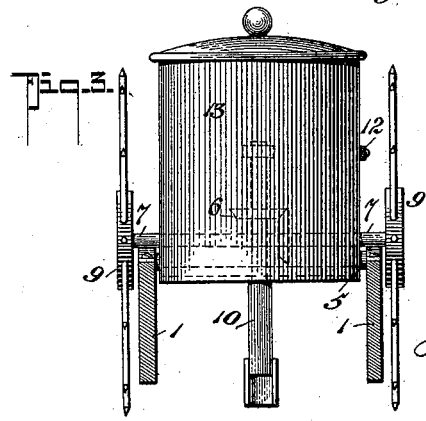
WITNESSES:
H. G. Dieterich
V. Bradford
INVENTOR
Isaac Detheridge
BY
Fred G. Dieterich & Co.
ATTORNEYS

UNITED STATES PATENT OFFICE.

ISAAC DETHERIDGE, OF FAME, KANSAS.

CULTIVATOR.

SPECIFICATION forming part of Letters Patent No. 622,996, dated April 11, 1899.

Application filed February 1, 1899. Serial No. 704,110. (No model.)

*To all whom it may concern:*

Be it known that I, ISAAC DETHERIDGE, residing at Fame, in the county of Greenwood and State of Kansas, have invented a new and Improved Cultivator, of which the following is a specification.

This invention is in the nature of a combined cultivator and planter more particularly adapted for cultivating the crop and replanting at such points where the first seed-dropping failed.

The purpose of my invention is to utilize the ordinary form of cultivator known as the "gopher" and combine with it seed-dropping devices and adjusting means whereby subsequent planting—that is, the filling of the gaps—can be done at the same time as the gopher is moved along to cultivate the young plants, cut weeds, &c.

My invention therefore comprehends the construction of a cultivator-frame, a seed-dropping mechanism, and an adjusting means capable of ready operation by the driver whereby the seed dropped can be effected at the will of the driver at such points where it is necessary to fill the gaps during the operation of cultivating the young plants.

To these ends my invention consists in certain details of construction and peculiar combination of parts, such as will be first described in detail and then pointed out in the appended claims, reference being had to the accompanying drawings, in which—

Figure 1 is a perspective view of my improved combined cultivator and planter. Fig. 2 is a vertical longitudinal section thereof, showing the parts in their different adjustments; and Fig. 3 is a transverse section taken practically on the line 3 3 of Fig. 2.

In its practical construction my improvement comprises a main frame of the ordinary gopher type, the same consisting of parallel sides or runners 1, which are braced and joined at the ends by the cross-pieces 2 2, said side members or runners being so spaced and of such depth as to straddle the young plants and travel freely in the furrows between the ridges. To the front end of each runner is secured a singletree, so that one horse can travel at each side of the row to pull the frame forward and straddle the said row.

3 indicates the driver's seat, secured on the rear cross-brace, and 4 denotes the cutters or knives, secured to the runners at or near their rear edges, which are adapted to run into and under the ridges to kill the weeds and cut down the ridges and level them to the ground.

At a point forward of the driver's seat the frame has a transverse bar 5, on which is pivotally mounted to rock longitudinally of the machine a seed drill or dropping mechanism, which may be of any well-known construction, the same being tiltably mounted on the said frame and having its dropper mechanism 6 held in gear with a wheel or shaft 7 in any approved manner, which shaft is arranged to receive motion from a drive-shaft 7, which in the present construction is journaled within the seedbox. The shaft 7 at each end carries a spider-wheel 9, which when the parts are set to the operative position enters the ground to a distance of about an inch or more below the runners and through this motion imparts a rotary action to the seed-dropping mechanism, which permits the seed to drop out of the boot 10, which extends in a rearward direction and has the usual drag-foot, as shown.

11 indicates a lever pivotally secured adjacent the driver's seat, which through the medium of the link 12 connects with the upper part of the seed-dropper casing 13.

So far as described, it will be readily seen that as the machine is drawn over the ridges it will act to cut the weeds and cultivate small plants in the usual manner.

Now it follows that as the driver watches the character of the ridge or plants he can readily at such point or points where the gaps occur tilt the drill-frame sufficient to bring the spider or walking wheel in contact with the ground. The said wheels thus receiving motion will impart movement to the rotary seed-dropping mechanism within the drill-body and permit the seed to be dropped, it being also understood that when the machine passes over that part of the ridge in which good plants appear the driver pulls said seed-dropping mechanism forward and tilts the drill sufficient to lift the wheels out of engagement with the ground, which adjustment also raises the shoe and plow out of the way of damaging the growing plant.

While I have described my invention as adapted to replant corn, it is obvious that the same may be used for planting other seed— such as Kafir corn, beets, sorghum, or other seeds. Furthermore, while my improved machine is particularly well adapted for use for replanting and cultivating listed corn it is obvious the same will operate just as well in planted or drilled corn.

My invention is of a very simple nature and can be manufactured at a very small cost and can be operated by the driver sitting at the end of the frame with his hand on the lever, said driver tilting the machine forward when the plants are regular in the row to travel over them and forcing the dropper mechanism down when the plants are missing. By this means he can plant every alternate hill, if needed, or one now and then, or he can lock it down and drill continuously as if never planted, it being understood that the lever has suitable ratchet-and-pawl mechanism whereby the tilting portion can be locked to its elevated or depressed position, as desired.

Having thus described my invention, what I claim, and desire to secure by Letters Patent, is—

1. A combined cultivator and planter; comprising a drag-frame arranged to straddle a row; seed-dropper devices tiltably mounted thereon including walking-wheels for operating the droppers, substantially as shown, whereby the walking-wheels can be elevated from or held to engage with the ground for the purposes specified.

2. A combined cultivator and planter; comprising in combination with the straddle or drag frame; a seed-dropping mechanism tiltably mounted on said frame; a shaft carried by said mechanism; walking-wheels on the said shaft, and lever-operated means for tiltably adjusting the said dropping mechanism and the walking-wheels, all being arranged substantially as shown and described.

3. An improved combined cultivator and planter; comprising a straddle-frame, consisting of a pair of runners coupled at the front and rear by transverse braces; a draft member on the front end of each runner; the driver's seat on the rear brace-bar; a cross-bar in advance of the seat; a seedbox having a dropping mechanism tiltably mounted on the cross-bar; a rotary shaft journaled transversely in the said box having its ends projecting freely over the upper edge of the runners, said shaft being geared with the seed-dropping device; walking-wheels mounted on the opposite end of the shaft and a lever adjacent the driver's seat, and a link connecting the lever and the seedbox, all being arranged substantially as shown and described.

ISAAC DETHERIDGE.

Witnesses:
ROBERT H. DETHERIDGE,
ISAAC DETHERIDGE, Jr.